UNITED STATES PATENT OFFICE.

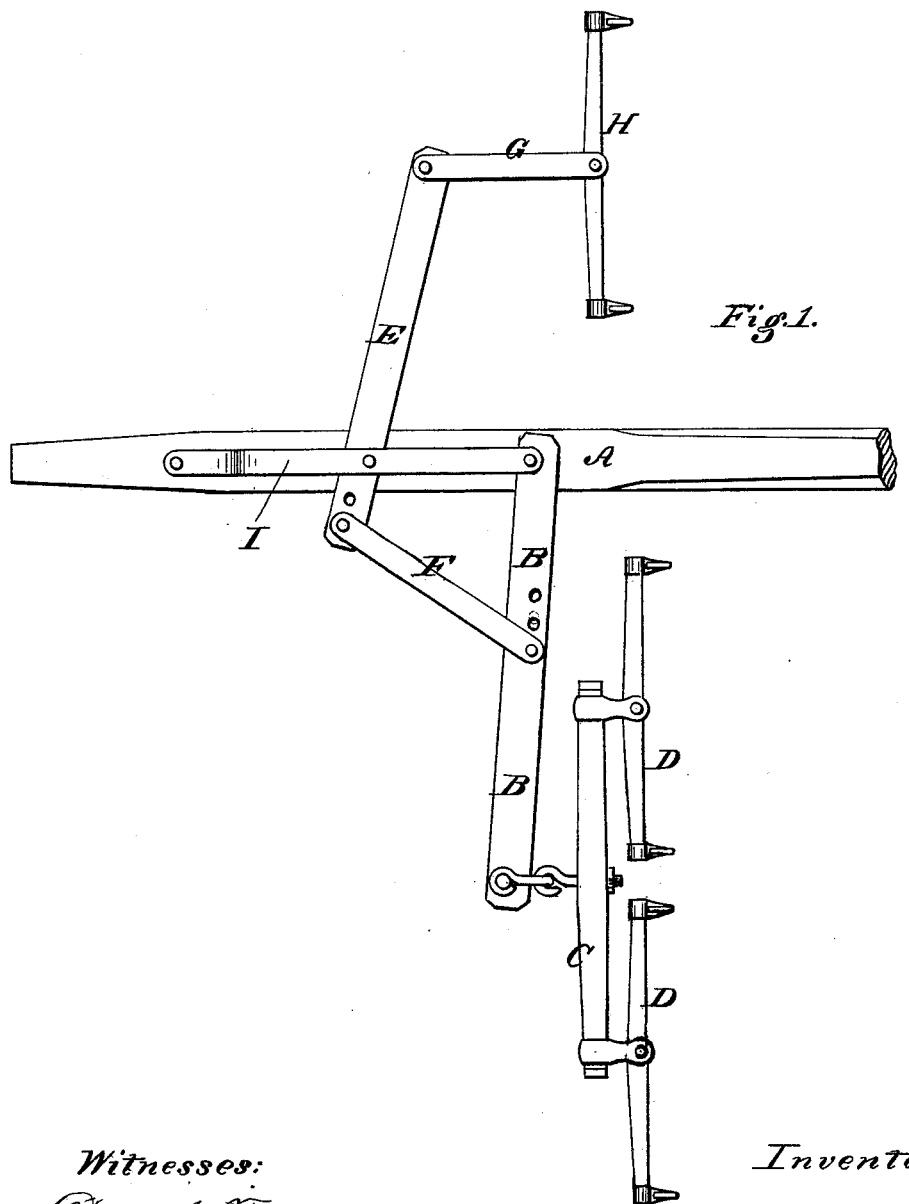

HORACE L. PHELPS, OF DODGE CENTRE, MINNESOTA.

IMPROVEMENT IN DRAFT-EQUALIZERS.

Specification forming part of Letters Patent No. 188,666, dated March 20, 1877; application filed July 7, 1876.

*To all whom it may concern:*

Be it known that I, HORACE L. PHELPS, of Dodge Centre, in the county of Dodge and State of Minnesota, have invented certain Improvements in Three-Horse Eveners, of which the following is a specification:

My invention relates to that class of three-horse eveners in which a combination of levers is employed to distribute the strain; and it consists in a peculiar arrangement of parts whereby the device is rendered simple and cheap in construction, easy in its action, and the horses permitted at the same time to walk abreast of each other.

The drawing represents a top-plan view of my device.

A represents the draft-pole or tongue, to receive the draft of the team; B, a lever pivoted at one end to the tongue, and provided at the other end with a clevis, to which is attached a double-tree, C, having its ends connected to two single-trees, D; E, a second lever, pivoted at some distance from its end upon and across the draft-pole, behind the lever B; F, a link connecting the inner end of the lever E with the middle of the lever B; G, a link attached to and extending forward from the outer end of the lever E, and provided with a single-tree, H, at its forward end; and I, a strap of metal attached to the draft-pole, and extending over the levers, for the purpose of holding them in a horizontal position and sustaining their pivots. If desired, the levers may be provided with holes to admit the adjustment of the ends of the connecting-link F, in such manner as to change the relative advantage of the levers according to the relative strength of the two horses at one side and the single horse on the other side of the draft-pole.

With the parts constructed and arranged as above, and properly proportioned, the strain and labor may be evenly divided between the three horses. The device is smooth and easy in its action, is free from liability to derangement, and is compact and simple in form.

I am aware that various eveners have been heretofore constructed in which levers were employed in different combinations, and therefore I lay no broad claim thereto.

Having described my invention, what I claim is—

The combination of the tongue A, lever B, pivoted at one end to the tongue, lever E, pivoted near one end across the tongue, and the link G, connecting the end of the lever E with the middle of lever B, as shown.

HORACE L. PHELPS.

Witnesses:
C. D. TUTHILL,
C. H. GARDNER.